United States Patent [19]

Hirose

[11] Patent Number: 4,470,831
[45] Date of Patent: Sep. 11, 1984

[54] PERMSELECTIVE MEMBRANE

[75] Inventor: Masakazu Hirose, Otsu, Japan

[73] Assignee: Toray Industries, Inc., Tokyo, Japan

[21] Appl. No.: 400,146

[22] Filed: Jul. 20, 1982

[30] Foreign Application Priority Data

Jan. 22, 1981 [JP] Japan .................................. 56-7232
May 21, 1981 [JP] Japan .................................. 56-77242

[51] Int. Cl.³ ............................................ B01D 53/22
[52] U.S. Cl. .................................... 55/158; 428/391;
428/447
[58] Field of Search .................. 55/16, 158; 427/387;
428/391, 447

[56] References Cited

U.S. PATENT DOCUMENTS

| 3,489,144 | 1/1970  | Dibelius et al. | 55/158 X |
| 3,534,528 | 10/1970 | Porter          | 55/16    |
| 3,754,375 | 8/1973  | Bouchilloux et al. | 55/16 |
| 3,767,737 | 10/1973 | Lundstrom       | 55/158 X |
| 3,980,457 | 9/1976  | Browall         | 55/158   |
| 4,157,960 | 6/1979  | Chang et al.    | 55/158 X |
| 4,214,020 | 7/1980  | Ward et al.     | 55/158 X |
| 4,230,463 | 10/1980 | Henis et al.    | 55/158 X |
| 4,239,793 | 12/1980 | Matsuura et al. | 55/158 X |
| 4,322,518 | 3/1982  | Blizzard        | 428/447  |

FOREIGN PATENT DOCUMENTS

| 56985   | 5/1979  | Japan | 55/158 |
| 5121    | 1/1981  | Japan | 55/158 |
| 24019   | 3/1981  | Japan | 55/158 |
| 4203    | 1/1982  | Japan | 55/158 |
| 122906  | 7/1982  | Japan . |      |
| 194004  | 11/1982 | Japan . |      |
| 2011804 | 7/1979  | United Kingdom . | |

Primary Examiner—Robert H. Spitzer
Attorney, Agent, or Firm—Austin R. Miller

[57] ABSTRACT

A gas permselective membrane comprising a porous support having fine pores continuous in the thickness direction and a layer of a polymer laminated on the surface of said porous support, said polymer comprising a copolymer of (a) and (b), where (a) represents silarylene-siloxane structural units represented by the following general formula

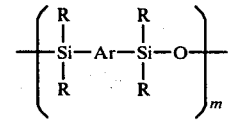

wherein R stands for an alkyl group having 1 to 10 carbon atoms, a phenyl group, a nucleus-substituted phenyl group having 6 to 20 carbon atoms, or a substituted alkyl group having 1 to 10 carbon atoms, Ar stands for

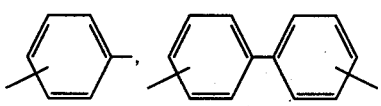

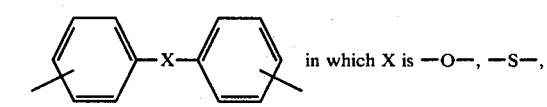 in which X is —O—, —S—,

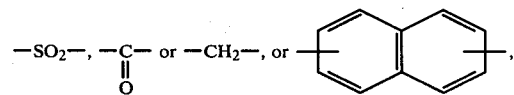

and m is a number of from 5 to 8000, and wherein (b) represents diorganosiloxane structural units represented by the following general formula

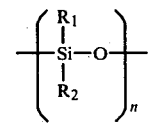

wherein $R_1$ and $R_2$ each independently stand for an alkyl group having 1 to 10 carbon atoms, a phenyl group, a nucleus-substituted phenyl group having 6 to 20 carbon atoms, a substituted alkyl group having 1 to 10 carbon atoms, a vinyl group, or an alkyl group, and n is a number of from 1 to 2000, with the proviso that n/m is in the range of $0 < n/m \leq 50$, wherein the average pore size of said porous membrane is 0.001 to 1 μm and the thickness of said polymer layer is 0.01 to 1 μm.

This permselective membrane has a high oxygen-separating capacity and is excellent in respect to pressure resistance and resistance to pinhole formation and, therefore, is valuable for obtaining from air oxygen-rich air-containing oxygen at a high concentration and at a low cost.

13 Claims, No Drawings

4,470,831

PERMSELECTIVE MEMBRANE

BACKGROUND OF THE INVENTION

(1) Field of the Invention

The present invention relates to a permselective membrane for use in the separation of a gas mixture. More particularly, the present invention relates to a composite membrane comprising a porous support and a film of a silicon-containing polymer having a specific structure, laminated on the porous substrate, which is especially effective for obtaining oxygen-rich air from air. More specifically, the present invention relates to a gas permselective membrane comprising a gas-separating active layer having a thickness not larger than 1 μm, which layer is uniformly laminated on a porous support membrane, and being excellent in respect to pressure resistance and resistance to pinhole formation.

(2) Description of the Prior Art

In an ordinary combustion system (for example, a boiler), air is used in addition to a fuel. If oxygen-rich air having an increased oxygen concentration is fed to the combustion system instead of air, the fuel efficiency and combustion temperature can be elevated and the amount of a combustion exhaust gas can be reduced, thereby saving energy and preventing environmental pollution.

As a method for separating oxygen from air, the cryogenic separation method has been carried out on an industrial and commercial scale. However, the cost of the production of oxygen-rich air according to this separation method is high, and if oxygen obtained according to this method is utilized for a combustion system, no substantial energy-saving effect can be attained.

As an oxygen-separating method having a lower oxygen production cost than that of the cryogenic separation method, there can be mentioned the pressure swing adsorption method using a zeolite-type adsorbent. Indeed, the oxygen production cost of this method is lower than that of the cryogenic separation method. However, the cost is still high when oxygen obtained according to this method is utilized for a combustion furnace such as a heating furnace or a boiler.

When a process for concentrating oxygen in air by using a separating membrane is utilized in the production of oxygen-rich air, since no phase change occurs at the time of separation, it is expected that oxygen-rich air can be obtained at a lower cost than in the conventional techniques.

Various permselective membranes for gas mixtures, especially gas permselective membranes for concentrating oxygen in air, have heretofore been proposed. For example, UK Patent Application GB 2,011,804A proposes a composite membrane comprising a thin film of a cross-linked silicone rubber laminated on a porous support. This composite membrane, however, is defective in various respects. For example, if the silicone rubber film is an ultra-thin film having a thickness of about 0.05 to about 0.5 μm, the mechanical strength is insufficient, and, therefore, if the silicone rubber film is coated on a porous substrate to form a composite membrane, pinholes are readily formed. Furthermore, if the gas-separating operation is continuously carried out by using this composite membrane, the membrane is broken or is caused to fall down into empty pores because of a transmembrane pressure difference present throughout the membrane, and the reliability of the separating capability of the membrane is poor. Moreover, in this composite membrane, since the active layer participating in the gas-separating action is composed of a cross-linked silicone rubber, the level of the oxygen permselectivity is inevitably the same as the level of a silicone rubber film. More specifically, in the case where the value of the separation factor $\alpha[\alpha = PO_2/PN_2$, in which $PO_2$ and $PN_2$ stand for the oxygen gas permeability and the nitrogen gas permeability of the membrane material and the unit is $cm^3(STP)\cdot cm/cm^2\cdot sec\cdot cmHg]$, is as small as about 2.2, the driving energy for the separating operation provided by a compressor or vacuum pump) is used for permeation of the nitrogen gas, which is inherently unnecessary, through the membrane, and, therefore, the energy cost required for the separating operation is increased as compared with the energy cost required when a membrane of a material having a higher separation factor (for example, a membrane material of $\alpha = 3$) is used. Accordingly, the use of a membrane having such a low separation factor is not preferred from an economical viewpoint. Furthermore, when a membrane having a separation factor of 2.2 is used, it is impossible to obtain oxygen-rich air having an oxygen concentration higher than 40% by one-stage separation.

U.S. Pat. No. 3,767,737 discloses a composite membrane formed by laminating on a porous substrate a thin film obtained by spreading a dilute organic solvent solution of a polysiloxane-polycarbonate block copolymer on the water surface. However, since the separation factor $PO_2/PN_2$ of the polysiloxane-polycarbonate block copolymer as the membrane material is 2, even if this composite membrane is used, it is impossible to obtain oxygen-rich air having an oxygen concentration higher than 40% from air by the ordinary membrane separation method.

As will be apparent from the foregoing description, when oxygen-rich air is obtained from air by using the above-mentioned gas permselective membrane comprising a thin layer of a silicone rubber, the driving energy required for the separating operation exceeds the economically allowable level, and an economical gas separation plant cannot be constructed by using the above-mentioned gas permselective membrane.

SUMMARY OF THE INVENTION

It is a primary object of the present invention to provide a permselective membrane in which the foregoing defects of the conventional techniques are eliminated, which comprises a gas-separating active layer having a thickness of not more than 1 μm, which layer is uniformly laminated on a porous support, and which is excellent in respect to pressure resistance and resistance to pinhole formation.

Another object of the present invention is to provide a gas-separating membrane having a high oxygen-separating capacity and being excellent in respect to pressure resistance and resistance to pinhole formation.

More specifically, in accordance with the present invention, there is provided a gas permselective membrane comprising a porous support having fine pores continuous in the thickness direction and a layer of a polymer laminated on the surface of said porous support, said polymer comprising a copolymer of (A) and (B) wherein (A) represents silarylene-siloxane structural units represented by the following general formula

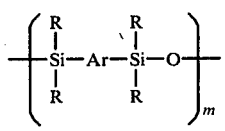

wherein
R stands for an alkyl group having 1 to 10 carbon atoms, a phenyl group, a nucleus-substituted phenyl group having 6 to 20 carbon atoms, or a substituted alkyl group having 1 to 10 carbon atoms, Ar stands for

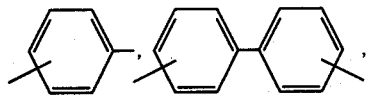

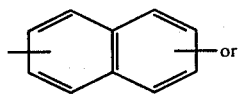

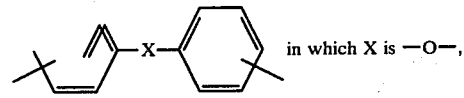

or —CH$_2$—, and m is a number of from 5 to 8000, and wherein (B) represents diorganosiloxane structural units represented by the following general formula

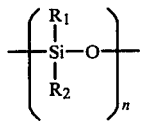

wherein
R$_1$ and R$_2$ each independently stand for an alkyl group having 1 to 10 carbon atoms, a phenyl group, a nucleus-substituted phenyl group having 6 to 20 carbon atoms, a substituted alkyl group having 1 to 10 carbon atoms, a vinyl group, or an allyl group, and n is a number of from 1 to 2000, with the proviso that n/m is in the range of 0<n/m≦50, wherein the average pore size of said porous support is 0.001 to 1 μm and the thickness of said polymer layer is 0.01 to 1 μm.

DETAILED DESCRIPTION OF THE PREFERRED EMBODIMENTS

The polymer layer of the permselective membrane of the present invention is composed of a polymer comprising a copolymer of (A) and (B) wherein
(A) represents silarylene-siloxane structural units represented by the following general formula

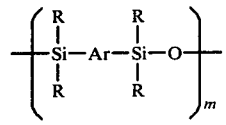

wherein
R stands for an alkyl group having 1 to 10 carbon atoms, a phenyl group, a nucleus-substituted phenyl group having 6 to 20 carbon atoms, or a substituted alkyl group having 1 to 10 carbon atoms, and Ar stands for

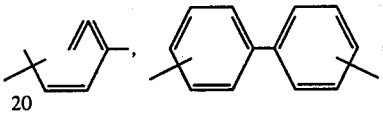

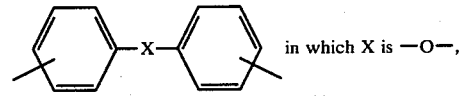

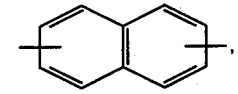

and diorganosiloxane structural units represented by the following general formula

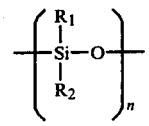

wherein
R$_1$ and R$_2$ each independently stand for an alkyl group having 1 to 10 carbon atoms, a phenyl group, a nucleus-substituted phenyl group having 6 to 20 carbon atoms, inclusive of a benzyl group, a substituted alkyl group having 1 to 10 carbon atoms, such as a halogenoalkyl group, a cyanoalkyl group, an aminoalkyl group, a nitroalkyl group, a hydroxyalkyl group, an alkoxyalkyl group, a carboxyalkyl group, or a mercaptoalkyl group, a vinyl group, or an allyl group.

In the above-mentioned polymer, the sequence lengths m and n are numbers satisfying the requirements of 5≦m≦8000, 1≦n≦2000, and 0≦n/m≦50, preferably the requirements of 5≦m≦1000, 1<n≦2000 and 1/100≦n/m≦50, especially preferably the requirement of 5≦m≦500, 1≦n≦500, and 1/100≦n/m≦20.

If the n/m value exceeds 50, the strength of the polymer film is reduced, and in the case of an ultra-thin film, the pressure resistance and the resistance to pinhole formation are degraded and no good results can be obtained.

Silarylene-siloxane structural units of the above general formula in which R is —CH$_3$,

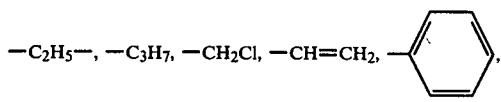

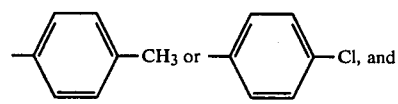

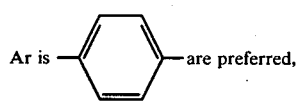

and those in which R is —CH₃ and

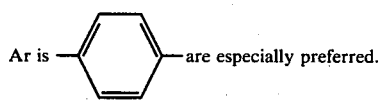

In the diorganosiloxane units represented by the following general formula

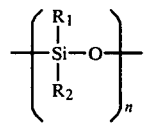

R₁ and R₂ each may be a substitutent selected from alkyl groups having 1 to 10 carbon atoms, a phenyl group, substituted alkyl groups having 1 to 10 carbon atoms, and nucleus-substituted phenyl groups having 6 to 20 carbon atoms. The preferred structural units are as follows.

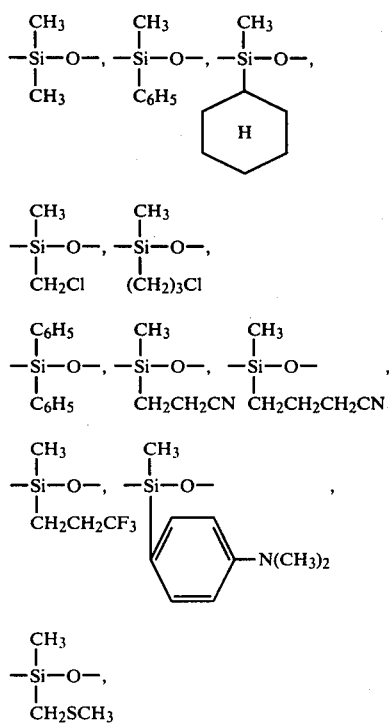

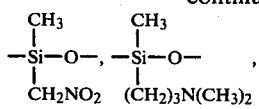

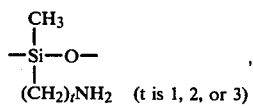

(t is 1, 2, or 3)

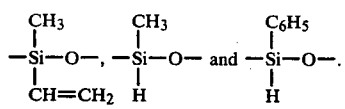

As the polymer that is especially preferably used in the present invention, there can be mentioned silphenylene-siloxane alternating random block copolymers having the following recurring units

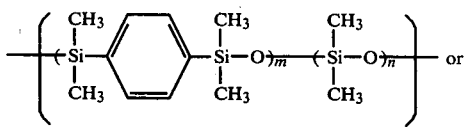 or

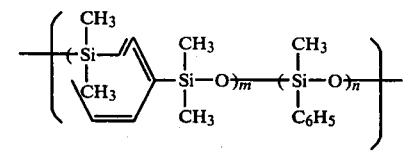

and polysilphenylene-siloxanes having the following recurring units

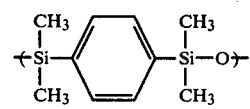

Structural units other than the above-mentioned silarylene-siloxane units and diorganosiloxane units may be incorporated in an amount of up to 40% by weight into the polymer used in the present invention by copolymerization or blending as long as the gas permeability and mechanical properties (such as pressure resistance and resistance to pinhole formation) of the ultra-thin film layer and adhesion of the ultra-thin film layer to the porous support are not degraded. For example, the following units are preferably incorporated.

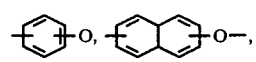

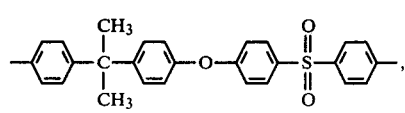

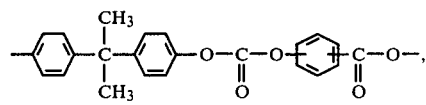

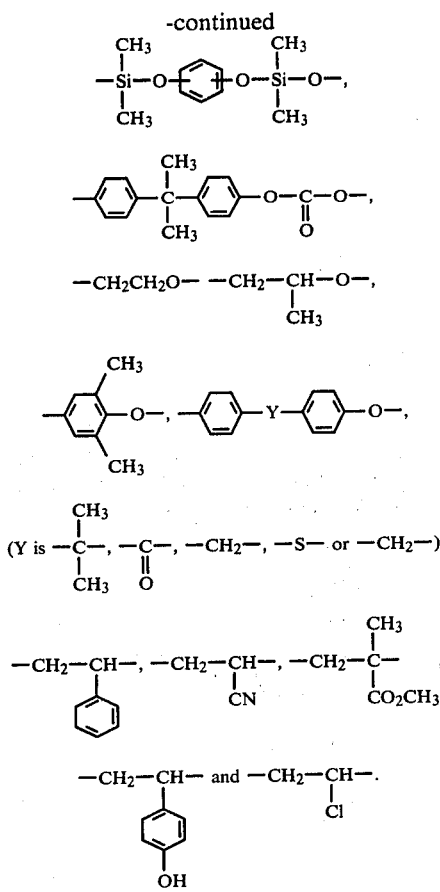

These silarylene-type polymers may be prepared according to known processes, and the preparation process is not particularly critical. For example, these polymers may be prepared according to a process disclosed in the Journal of Polymer Science, Part A, Volume 12, pages 15–29 (1964).

Any porous molded articles can be used as the porous support in the present invention. It is preferred to use a porous support having an air-permeable structure in which the pore size of fine pores on one surface is 0.001 to 1 μm, especially 0.005 to 0.1 μm. For example, there are preferably used microporous membranes composed of polypropylene, polyethylene, polysulfone, polyether sulfone, cellulose acetate, ethyl cellulose, polyvinyl chloride, or polytetrafluoroethylene. Microporous membranes composed of polysulfone, polyether sulfone, or cellulose acetate are especially preferred.

If the pore size of the fine pores on the surface of the porous support is less than 0.001 μm, the gas transmission rate of the composite membrane is reduced and no good results can be obtained.

On the other hand, if the pore size of the fine pores on the surface of the porous substrate exceeds 1 μm, since the gas-separating ultra-thin film layer is caused to fall into empty pores on the surface of the porous support at the gas-separating operation, pinholes are formed on the ultra-thin film, and when the gas-separating operation is continuously carried out, the gas permeation rate is reduced with the lapse of time.

It is preferred that the pore size of the fine pores on the surface of the porous support be smaller than the thickness d of the ultra-thin film to be laminated on the porous support, especially smaller than one half of the thickness d. If the pore size exceeds the thickness d, the membrane is readily deformed by the transmembrane pressure difference at the gas-separating operation, and when the gas-separating operation is continuously carried out for a long time, the gas permeation rate is reduced with the lapse of time and pinholes are often formed. The porous support is not limited to a plane porous support as described above, and a porous hollow fiber or the like may be used.

Lamination of the polymer layer of the present invention on the porous support may be accomplished by dissolving the polymer in an appropriate solvent such as benzene, cyclohexane, n-hexane, n-heptane, iso-pentane, toluene, xylene, chloroform, methylene chloride, carbon tetrachloride, dichloroethane, or a mixture thereof to form a dilute solution and by coating the dilute solution on the porous substrate. The polymer concentration in the polymer solution may be 0.2% to 20% by weight, preferably 0.5% to 5% by weight.

It is preferred that the thickness of the laminated film be larger than the pore size of the porous support. More specifically, the thickness of the laminated film may be 0.01 to 1 μm, preferably 0.05 to 0.7 μm and especially preferably 0.1 to 0.5 μm.

Coating of the polymer solution in an organic solvent on the porous support is preferably accomplished by using an ordinary coater. It is preferred that a gravure roll coater, a slit die coater, a kiss coater, a fountain coater, a curtain coater, or a dip coater be used for the coating operation.

The coating operation is advantageously carried out at a temperature which is approximately room temperature. However, the coating operation may be carried out at a slightly elevated or reduced temperature as long as no particular disadvantage is brought about.

The porous substrate coated with the polymer solution in an organic solvent is ordinarily dried in an ordinary hot-air circulation oven at 50° C. to 200° C. for 10 seconds to 10 minutes. Air drying or preliminary drying at a temperature slightly lower than the predetermined drying temperature may be carried out before the drying operation.

The thickness of the ultra-thin film prepared according to the above-mentioned film-forming method is determined substantially directly by the concentration of the polymer solution coated and the amount of the polymer supplied to the unit area of the porous support. It is preferred that the coating conditions be set so that the thickness of the ultra-thin film after drying is 0.01 to 1 μm, especially 0.05 to 0.7 μm.

As will be apparent from the foregoing description, according to the present invention, an ultra-thin film layer of a silicon polymer of a specific structure having a high oxygen-gas permeability and a high mechanical strength is uniformly laminated on a porous support to form a gas permselective membrane. This gas-separating composite membrane of the present invention has the following excellent characteristic properties:

(1) Since the oxygen gas permselectivity is very high, oxygen-rich air having a high oxygen concentration can be obtained at a high efficiency by a one-stage separating operation when the permselective membrane of the present invention is used.

(2) Even if the gas-separating operation is continuously carried out for a long time, such disadvantages as the formation of pinholes due to the transmembrane pressure difference present throughout the membrane, resulting in a reduction of the gas-separating capacity, and sinking of the ultra-thin film layer into the pores on the porous support, resulting in a reduction of the gas transmission rate, are not presented.

(3) Even if the gas-separating operation is carried out for a long time, a reduction of the gas-separating capacity due to breakage of the ultra-thin film layer as a result of dust in the air is not caused at all.

The present invention will not be described in detail with reference to the following Examples that by no means limit the scope of the invention.

EXAMPLE 1

1,4-bis(hydroxydimethylsilyl)benzene (having a melting point of 135° C.) having the following formula

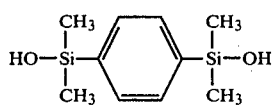
(A)

was synthesized by the Grignard coupling reaction of dimethyldichlorosilane with p-bromobenzene in tetrahydrofuran. In a nitrogen stream, 0.5 parts by weight of a salt of 2-ethylhexanoic acid with n-hexylamine and 100 parts by weight of the compound (A) were stirred under atmospheric pressure for 3 hours. The reaction vessel was evacuated to 0.4 Torrs and the reaction mixture was stirred at 200° C. for 4 hours to complete polymerization. After the completion of polymerization, the formed polymer was dissolved in benzene and the solution was thrown into a large amount of methanol to precipitate the polymer. The polymer was collected and dissolved in benzene to form a solution having a polymer concentration of 0.5% by weight. The solution was coated on a "Millipore Filter VSWP" (a cellulose acetate porous membrane having an average pore size of 250 Å; supplied by Millipore Corp.). When the cross section of the ultra-thin film was observed by means of an electron microscope, it was found that the thickness of the coated layer was 0.25 μm. The gas permeation rates of the obtained composite membrane were measured at 25° C. by using a gas permeation rate measuring apparatus (Model GTR-10 supplied by Yanagimoto Seisakusho) provided with a gas chromatographic detector. It was found that the oxygen gas permeability was $4.0 \times 10^{-5}$ cm$^3$/cm$^2$·sec·cmHg, the permeability per centimeter of the thickness of the coated layer was $1 \times 10^{-9}$ cm$^3$·cm/cm$^2$·sec·mmHg, and the separation factor (PO$_2$/PN$_2$) was 4.0.

EXAMPLE 2

A porous membrane ("Millipore Filter VSWP"; average pore size, 250 Å; diameter, 90 mm) was immersed in methanol for 30 minutes and then immersed in water for 10 minutes. The surface of the so-treated filter was coated with a uniform water layer.

In 100 parts by weight of cyclohexane was dissolved 10 parts by weight of a silphenylene-siloxane alternating random block copolymer having the following recurring units

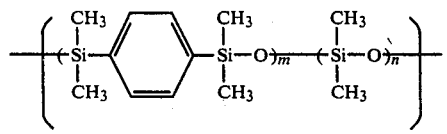

(n=380, n/m=3, [η]=2.0 in toluene) to form a homogeneous solution. Then isopentane was added to the solution so that the polymer concentration in the solution was 0.5% (wt/wt).

The polymer solution was cast on the above porous membrane with the porous membrane being kept horizontal. Then the porous membrane was vertically erected so that the unnecessary solution flowed down. Next, the coated porous membrane was air-dried and dried in a hot-air circulation oven at 70° C. In the obtained composite membrane, the thickness of the layer of the silphenylene-siloxane block copolymer was 0.064 μm. The gas permeation rates of the composite membrane were determined at 25° C. by using the aforementioned gas permeation rate measuring apparatus provided with a gas chromatographic detector. It was found that the oxygen gas permeability was $4.69 \times 10^{-4}$ cm$^3$/cm$^2$·sec·cmHg and the separation factor (PO$_2$/PN$_2$) was 3.0.

This composite membrane was attached to a gas-separating cell having a diameter of 28 cm, and air maintained under atmospheric pressure was supplied to one surface of the membrane. The other surface of the membrane was evacuated to 0.1 atmosphere with a diaphragm-type vacuum pump. Oxygen-rich air having an oxygen concentration of 41% was recovered from the pump outlet at a flow rate of 540 ml/min.

When this gas-separating operation was continuously carried out for 1 month, the oxygen concentration in the oxygen-rich air was 39% and the flow rate of the oxygen-rich air was 545 ml/min. Thus, it was confirmed that the initial separation capacity was substantially maintained.

EXAMPLE 3

A dimethylformamide solution of a polysulfone resin (supplied by Union Carbide Corporation) having a solid content of 20% by weight was extrusion-laminated from a slit die on a polyester nonwoven fabric continuously travelled along a drum face, and the laminated solution was coagulated in a water bath to form a porous support. When the pore size of fine pores on the surface of the porous support was examined with a scanning electron microscope, the average pore size was found to be 120 Å. Desolvation was effected by water washing, the polysulfone porous support containing water in the pores thereof was continuously rolled out, and the cyclohexane solution of the silphenylene-siloxane block copolymer used in Example 2 (1.5% by weight) was continuously coated on the porous support. The coated porous support was then dried and wound.

In the so-obtained composite membrane, the thickness of the silphenylene-siloxane block copolymer was 0.12 μm.

The gas permeation rates of the composite membrane were determined according to the method described in Example 1. It was found that the oxygen gas permeability was $2.5 \times 10^{-4}$ cm$^3$/cm$^2$·sec·cmHg and the separation factor (PO$_2$/PN$_2$) was 3.0.

Small test pieces were cut out from this long composite membrane, and the oxygen-enriching test was carried out in the same manner as described in Example 1.

At the initial stage, oxygen-rich air having an oxygen concentration of 42% was obtained at a flow rate of 290 ml/min. After the operation was continuously carried out for 1 month, oxygen-rich air having an oxygen concentration of 35% was obtained at a flow rate of 350 ml/min.

I claim:

1. A gas permselective membrane which comprises a porous support having fine pores continuous in the thickness direction and a layer of a polymer laminated on the surface of said porous support, said polymer comprising a copolymer of (A) and (B), where (A) represents silarylene-siloxane structural units represented by the following general formula

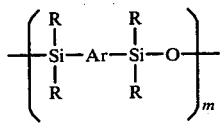

wherein

R stands for an alkyl group having 1 to 10 carbon atoms, a phenyl group, a nucleus-substituted phenyl group having 6 to 20 carbon atoms, or a substituted alkyl group having 1 to 10 carbon atoms, Ar stands for

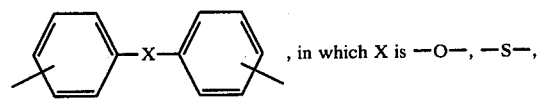, in which X is —O—, —S—,

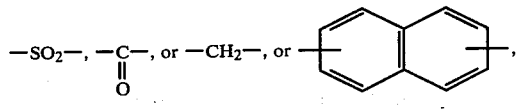

and m is a number of from 5 to 8000, and wherein (B) represents diorganosiloxane structural units represented by the following general formula

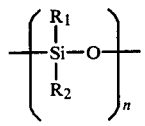

wherein $R_1$ and $R_2$ each independently stand for an alkyl group having 1 to 10 carbon atoms, a phenyl group, a nucleus-substituted phenyl group having 6 to 20 carbon atoms, a substituted alkyl group having 1 to 10 carbon atoms, a vinyl group, or an allyl group, and n is a number of from 1 to 2000, with the proviso that n/m is in the range of $0 < n/m \leq 50$, wherein the average pore size of said porous membrane is 0.001 to 1 μm and the thickness of said polymer layer is 0.01 to 1 μm.

2. A gas permselective membrane as set forth in claim 1, wherein Ar is a

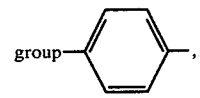

and R is a group —$CH_3$.

3. A gas permselective membrane as set forth in claim 1, wherein $R_1$ and $R_2$ stand for a group —$CH_3$.

4. A gas permselective membrane as set forth in claim 1, wherein $R_1$ is a group —$CH_3$, and $R_2$ is a

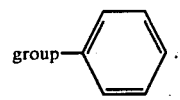

5. A gas permselective membrane as set forth in claim 1, wherein Ar is a

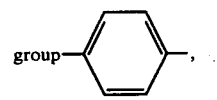

R is a group —$CH_3$, and $R_1$ and $R_2$ stand for a group —$CH_3$.

6. A gas permselective membrane as set forth in claim 1, wherein Ar is a

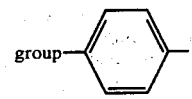

R is a group —$CH_3$, $R_1$ is a group —$CH_3$, and $R_2$ is a

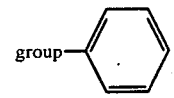

7. A gas permselective membrane as set forth in claim 1, wherein m is a number of from 5 to 1000, n is a number of 1 to 2000, and n/m is the range of $1/100 \leq n/m \leq 50$.

8. A gas permselective membrane as set forth in claim 1, wherein m is a number of from 5 to 500, n is a number of from 1 to 500, and n/m is in the range of $1/100 \leq n/m \leq 20$.

9. A gas permselective membrane as set forth in claim 1, wherein the porous support is composed of a polysulfone resin, a polyether sulfone resin, or cellulose acetate.

10. A gas permselective membrane as set forth in claim 9, wherein the average pore size of the porous support is 0.005 to 0.05 μm.

11. A gas permselective membrane as set forth in claim 1, wherein the average pore size of the porous membrane is 0.005 to 0.05 μm.

12. A gas permselective membrane as set forth in claim 1, wherein the thickness of the polymer layer is 0.05 to 0.7 μm.

13. A gas permselective membrane as set forth in claim 1, wherein the thickness of the polymer layer is 0.1 to 0.5 μm.

* * * * *

UNITED STATES PATENT AND TRADEMARK OFFICE
CERTIFICATE OF CORRECTION

PATENT NO. : 4,470,831

DATED : September 11, 1984

INVENTOR(S) : Masakazu Hirose

It is certified that error appears in the above-identified patent and that said Letters Patent is hereby corrected as shown below:

Column 3, line 30, figure should read -- 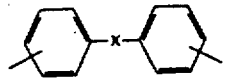 -- .

Column 4, line 19, figure should read --  --.

line 34, after "and" insert --wherein (B) represents--

Column 9, line 32, "o.4 Torrs" should read --0.5 Torrs--

Signed and Sealed this

Fifth Day of November 1985

[SEAL]

Attest:

DONALD J. QUIGG

Attesting Officer

Commissioner of Patents and Trademarks